US008716942B2

(12) United States Patent
Jarrell et al.

(10) Patent No.: US 8,716,942 B2
(45) Date of Patent: *May 6, 2014

(54) MANAGING LIGHT SYSTEM ENERGY USE

(71) Applicant: IPiXC LLC, San Anselmo, CA (US)

(72) Inventors: John A. Jarrell, San Anselmo, CA (US);
Robert C. Hendrickson, Stillwater, MN (US)

(73) Assignee: IPiXC LLC, San Anselmo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/957,661

(22) Filed: Aug. 2, 2013

(65) Prior Publication Data

US 2013/0334970 A1   Dec. 19, 2013

Related U.S. Application Data

(63) Continuation of application No. 13/229,542, filed on Sep. 9, 2011, now Pat. No. 8,502,456.

(60) Provisional application No. 61/381,121, filed on Sep. 9, 2010.

(51) Int. Cl.
*H05B 37/02* (2006.01)
(52) U.S. Cl.
USPC .......................................... 315/131; 315/291
(58) Field of Classification Search
USPC ............... 315/131, 134, 149, 291, 307, 308; 340/3.1, 3.3, 635, 825, 825.06
See application file for complete search history.

(56) References Cited

U.S. PATENT DOCUMENTS

| 6,035,266 | A | * | 3/2000 | Williams et al. ............... 702/188 |
| 7,321,115 | B2 | | 1/2008 | Langlois et al. |
| 7,429,828 | B2 | | 9/2008 | Cleland et al. |
| 7,608,815 | B2 | | 10/2009 | Sharma et al. |
| 7,734,356 | B2 | | 6/2010 | Cleland et al. |
| 7,813,111 | B2 | | 10/2010 | Anderson et al. |
| 7,834,555 | B2 | | 11/2010 | Cleland et al. |
| 8,264,156 | B2 | | 9/2012 | Cleland et al. |
| 8,290,710 | B2 | | 10/2012 | Cleland et al. |
| 8,433,426 | B2 | | 4/2013 | Cleland et al. |
| 8,502,456 | B2 | * | 8/2013 | Jarrell et al. .................... 315/131 |
| 8,529,085 | B2 | | 9/2013 | Josefowicz et al. |
| 2007/0001113 | A1 | | 1/2007 | Langlois et al. |
| 2007/0001833 | A1 | | 1/2007 | Sharma et al. |
| 2007/0025110 | A1 | | 2/2007 | Langlois et al. |
| 2007/0025111 | A1 | | 2/2007 | Jacklin et al. |
| 2007/0043540 | A1 | | 2/2007 | Cleland et al. |
| 2008/0054821 | A1 | * | 3/2008 | Busby ............................ 315/291 |
| 2009/0001893 | A1 | | 1/2009 | Cleland et al. |
| 2009/0066258 | A1 | | 3/2009 | Cleland et al. |

(Continued)

*Primary Examiner* — Jimmy Vu
(74) *Attorney, Agent, or Firm* — Fish & Richardson P.C.

(57) ABSTRACT

A first lighting assembly receives a lighting profile that instructs the first lighting assembly to operate according to the lighting profile over a first period of time. The received lighting profile is implemented, including causing a light of the first lighting assembly to illuminate at a first intensity. An input acquired in proximity to the first lighting assembly and indicating activity in a region proximate the first lighting assembly is received. The received lighting profile is then deviated from, in response to the received input, by increasing the intensity of the light to illuminate at a second intensity for a predetermined period of time. A message is transmitted for receipt by the control center, the message including an indication of the increased light intensity and an identifier associated with the first lighting assembly.

22 Claims, 9 Drawing Sheets

(56) References Cited

U.S. PATENT DOCUMENTS

| | | |
|---|---|---|
| 2009/0066540 A1 | 3/2009 | Marinakis et al. |
| 2009/0262189 A1 | 10/2009 | Marman |
| 2010/0201267 A1 | 8/2010 | Bourquin et al. |
| 2010/0264853 A1 | 10/2010 | Amutham |
| 2010/0320917 A1 | 12/2010 | Tsou |
| 2011/0053492 A1 | 3/2011 | Hochstein |
| 2011/0057570 A1 | 3/2011 | Cleland et al. |
| 2011/0187273 A1 | 8/2011 | Summerford et al. |
| 2013/0057158 A1 | 3/2013 | Josefowicz et al. |
| 2013/0193876 A1 | 8/2013 | Cleland et al. |

\* cited by examiner

MANAGING LIGHT SYSTEM ENERGY USE

CROSS-REFERENCE TO RELATED APPLICATION

This application is a continuation of U.S. patent Ser. No. 13/229,542, filed on Sep. 9, 2011, which claims the benefit of U.S. Provisional Application No. 61/381,121, filed Sep. 9, 2010. The content of the foregoing applications is hereby incorporated by reference in their entirety.

TECHNICAL FIELD

This disclosure relates to managing energy use in a system of lights.

BACKGROUND

Costs associated with energy use by streetlights or parking lot lights can be a significant portion of a city budget. For example, in some cases costs associated with powering such lights can represent up to 10% of a city's operating budget. One way of minimizing energy use in street lights is to equip the lights with an ambient light sensor that causes each light to individually be fully powered on each evening when the sensed ambient light drops to a particular level. Similarly, the sensor may sense increasing ambient light in the morning as the sun rises, and may cause the light to be completely powered off at that time.

SUMMARY

In a first general aspect, a computer-implemented method of managing energy use in a system of lights includes receiving, at a communications receiver of a first lighting assembly, a lighting profile that instructs the first lighting assembly to operate according to the lighting profile over a first period of time, where the lighting profile is received wirelessly by the communications receiver from a control center remote from the first lighting assembly. The control center additionally provides lighting profiles to a plurality of other lighting assemblies. The method also includes implementing, at the first lighting assembly, the received lighting profile, including causing a light of the first lighting assembly to illuminate at a first intensity. The method further includes receiving, at a sensing module of the first lighting assembly, an input acquired in proximity to the first lighting assembly, the input indicating activity in a region proximate the first lighting assembly. The method further includes deviating from the received lighting profile by increasing the intensity of the light of the first lighting assembly, in response to the received input acquired in proximity to the first lighting assembly, by causing the light of the first lighting assembly to illuminate at a second intensity for a predetermined period of time, the second intensity greater than the first intensity. The method further includes wirelessly transmitting a message via a communications transmitter of the first lighting assembly for receipt by the control center, the message comprising an indication of the increased light intensity and an identifier associated with the first lighting assembly.

Implementations may include one or more of the following. The input may include a radio frequency signal indicative of mobile electronic device used within the region proximate the first lighting assembly, or a Bluetooth signal. The input may include detected motion within the region proximate the first lighting assembly. The input may include a sound, for example, such as a sound associated with a motorized vehicle. The sensing module may compare the received sound to one or more stored representations of sounds, may identify a similarity between the received sound and one of the one or more stored representations of sounds, and the second intensity may be based on the identified similarity. The input may include a light signal. The method may additionally include initiating a timer when the light intensity of the light of the first lighting assembly is increased, the timer to count for the predetermined period of time, and reverting to the received lighting profile in response to the timer counting for the predetermined period of time. The predetermined period of time is associated with the received input, and a first predetermined period of time associated with a first input may differ from a second predetermined period of time associated with a second input. Responsive to receiving the input, a control module of the first lighting assembly may increment a counter and delay the deviating from the received lighting profile until the counter reaches a profile deviation threshold value. Incrementing the counter may include incrementing the counter by a count value, where the count value may be determined based on the received input, and where different types of received input may cause the counter to be incremented by different count values. The method may also include receiving, at the communications receiver of the first lighting assembly, a communication from a second lighting assembly, and varying light intensity of the light of the first lighting assembly based on the received communication from the second lighting assembly. The message may include an indication of energy usage by the first lighting assembly. The message may include a request that the control center instruct lighting assemblies in a vicinity of the first lighting assembly to adjust their light intensities. The method may also include wirelessly transmitting a second message via the communications transmitter of the first lighting assembly for receipt by the other lighting assemblies, the second message including an instruction to the other lighting assemblies to adjust their light intensities. The message may also include receiving, at the communications receiver of the first lighting assembly, a second lighting profile, and implementing, at the first lighting assembly, the second lighting profile rather than the first lighting profile, the second lighting profile received wirelessly by the communications receiver from the control center. The method may also include receiving, with the lighting profile, a security question, the lighting profile and the security question included in a message from the control center, and wherein accessing the lighting profile is dependent on the first lighting assembly providing a correct answer to the security question.

In a second general aspect, a lighting assembly includes a light, and a communications receiver configured to receive a lighting profile that instructs the lighting assembly to operate according to the lighting profile over a first period of time, the lighting profile received wirelessly by the communications receiver from a control center remote from the lighting assembly, wherein the control center additionally provides lighting profiles to a plurality of other lighting assemblies. The lighting assembly also includes a light control module configured to implement the received lighting profile, including causing the light to illuminate at a first intensity. The lighting assembly further includes a sensor module configured to receive an input acquired in proximity to the lighting assembly, the input indicating activity in a region proximate the lighting assembly. The light control module is additionally configured to deviate from the received lighting profile by increasing the intensity of the light, in response to the received input acquired in proximity to the lighting assembly, by causing the light to illuminate at a second intensity for a predetermined period of time, the second intensity greater than the first intensity. The lighting assembly additionally includes a communications transmitter configured to wirelessly transmit a message, for receipt by the control center, the message comprising an indication of the increased light intensity and an identifier associated with the lighting assembly.

Advantages that may be provided by the systems, devices, and methods described herein can include one or more of the following: reduced power consumption, energy savings, cost savings, reduced light pollution, coordinated lighting functionality, responsive lighting behavior, on-demand lighting provision, secure lighting command communication pathways, increased public safety, and adaptive lighting behavior.

DESCRIPTION OF DRAWINGS

Like reference symbols in the various drawings indicate like elements.

DETAILED DESCRIPTION

Figure 1:
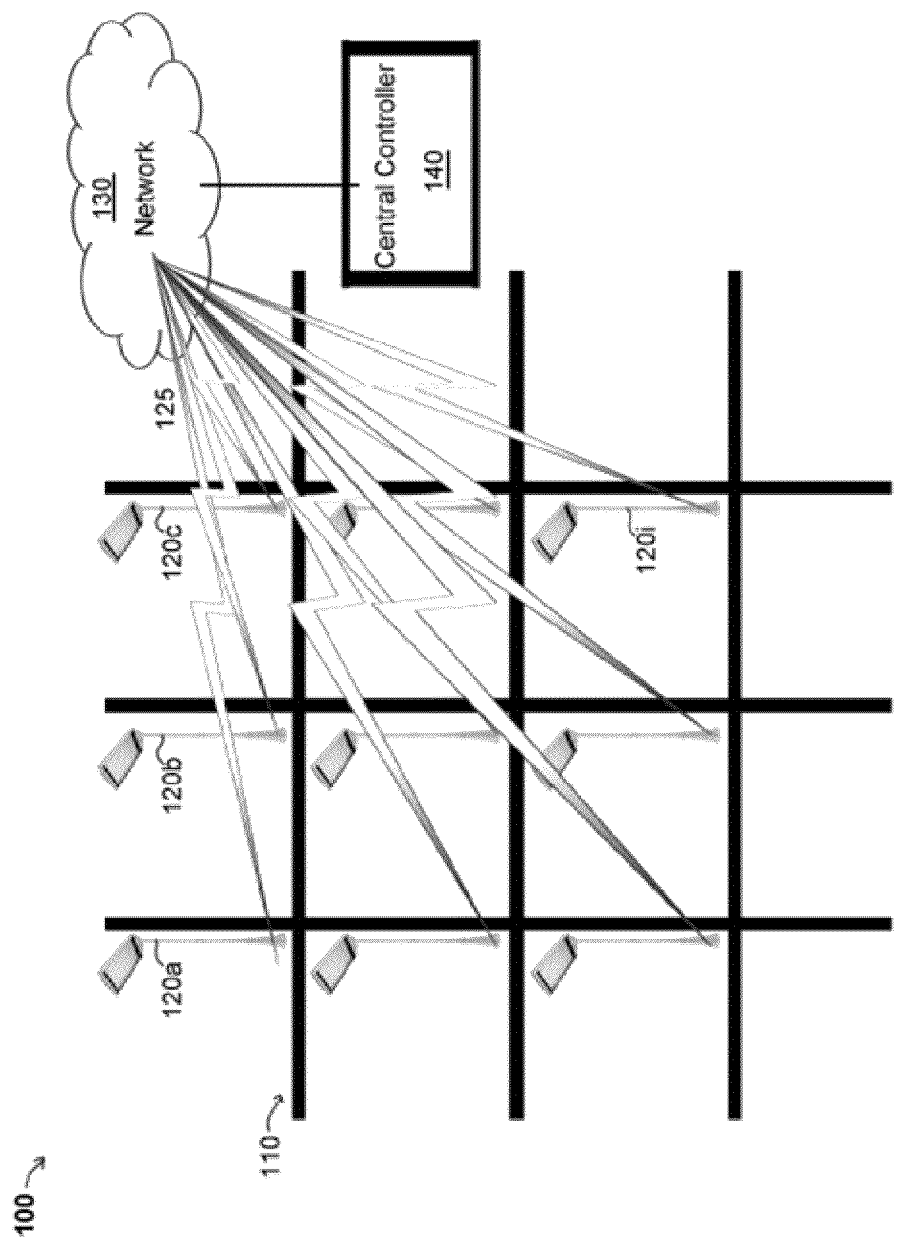
FIG. 1 shows a schematic of a street light management system in accordance with the present disclosure.

Described herein are systems, devices, and techniques that can be used to reduce energy consumption in street lighting systems or parking lot lighting systems. In various implementations, a combination of remote control of individual or groups of streetlights by a control station may be combined with local detection of activity at or near a particular lighting assembly may be used to reduce the amount of energy used by a particular streetlight or group of streetlights. For example, the control station or control center may provide or command a particular lighting profile or set of illumination instructions to a lighting assembly. The lighting profile may be designed to minimize or reduce energy use by the light versus a traditional schedule of turning the light fully on at dusk, leaving the light fully on all night, and turning the light off in the morning. Additionally, the lighting assembly may deviate from the received lighting profile by altering illumination characteristics of the light based on one or more inputs sensed at or near the lighting assembly. Examples of sensed inputs that may cause the lighting assembly to deviate from the lighting profile can include sensed motion, sensed audio input (e.g., sounds), sensed communication signals (e.g., radio frequency (RF) signals of various kinds), sensed particulates in the air (e.g., smoke, natural gas), dedicated input signals directed to the assembly (e.g., a laser beam), and others. In various implementations, the lighting assembly may alter or change light output intensity in correspondence to the detected condition. For example, in some cases the assembly may increase light intensity; in some cases the assembly may decrease light intensity; in some cases, the assembly may alter intensity (increase or decrease) according to a predetermined pattern.

For example, street light systems may be configured to adapt to environment changes as well as human activities. In general, the system may operate to reduce the amount of power consumed by the lighting assemblies to reduce the amount of energy used. This may include providing less light than has been traditionally provided during certain periods of time, for example, as by powering the lights at a reduced level or leaving the lights off for periods of time where they traditionally would have been fully powered. They system nevertheless provides adequate lighting by reacting to activity sensed within a proximity of a particular lighting assembly, so that pedestrians, motorists, and other "users" of lighting systems are adequately served. In some cases, the street light assemblies may intelligently respond to emergencies, accidents, and events. In some cases, the street light assemblies may be optimally preprogrammed to minimize energy consumption in a wide area wherein a number of light assemblies are interconnected via a secure network system. In various implementations, security provisions are included with communications passed between components of the street light system to prevent unauthorized access. The system can be configured to store records of energy use, changes in environmental factors, human activities, and statuses of components of the systems for establishing a reference library for generating an optimal control lighting profile.

Advantages that may be provided by the systems, devices, and methods described herein can include one or more of the following: reduced power consumption, energy savings, cost savings, reduced light pollution, coordinated lighting functionality, responsive lighting behavior, on-demand lighting provision, secure lighting command communication pathways, increased public safety, and adaptive lighting behavior.

FIG. 1 shows a schematic of a street light management system 100 in accordance with the present disclosure. The street light management system 100 includes a generic grid representation 110 of streets, such as streets in a city, an array of street light assemblies 120a, 120b, 120c, . . . , 120i distributed in the grid 110, a network 130 and a central controller 140. The street light assemblies 120 are individually communicably connected to the central controller 140 via the network 130, as represented by communication paths 125 (for simplicity, individual communication paths are shown but are not individually labeled). The communication paths 125 may represent wireless communication paths in some implementations. In other implementations, some or all of the communications paths 125 may represent wired paths. Although in this implementation, the street grid 110 is shown to have three avenues by three streets, the street grid 110 may represent any street layout in a selected area. For example, one central controller 140 may control the street lights for an entire town or city in some examples. In some examples, a city may include two or more central controllers 140. Similarly, the array of street light assemblies may include a number of actual light assemblies 120 suited for the street grid 110, in accordance with legal and/or safety regulations.

In some examples, communications between the street light assemblies 120 and the central controller 140 may occur over a secure network, or may include security provisions associated with each communication as will be described below. The network 130 may directly or indirectly connect/integrate with the central controller 140. During operation, the street light assemblies 120 may first receive a lighting profile that contains instructions for operation from the central controller 140. The street light assemblies 120 may then execute the received lighting profile. The lighting profile can take any number of forms, and can convey any number to instructions. In some examples, the profile may include a power function over time. In some examples, the profile may include a schedule of light intensities over time. In some examples, the profile may include durations over which certain light intensities can be implemented by the lighting assemblies. In some examples, the profile can be tailored for a particular season or time of the year, based on factors associated with the season or time or the year (e.g., hours of darkness, moon phases, and the like). In some cases, the profile can be tailored to present or expected weather conditions. The lighting profile can be defined to optimally save energy. For example, the lighting profile may be defined to produce an illumination just bright enough for perception of the human eyes in combination with ambient light, such as day light and moon light.

In some implementations, the lighting profile includes an onset time relating to the expected time of sunset, or to account for annual day time variation, or latitude variation. For example, the lighting profile may be generated using historic data of ambient light to predict the light change gradient during sunset and sunrise so that the total energy consumption can be minimized. In various implementations, the street light assemblies 120 may include sodium vapor lights, light emitting diodes, incandescent light, fluorescent light, neon light, and/or other types of luminaire suitable for street illumination. The street light assemblies 120 may be beacon lights, roadway lights, parking lot lights or parking ramp lights, under various implementations.

The street light assemblies 120 may include a sensing module that can receive input indicative of activity in proximity to the street light assemblies 120. For example, the street light assembly 120 may include an audio sensor (e.g., a microphone) for receiving audio input, such as the sound of made by people, animals, machinery, or the like, or a siren (e.g., police, fire dept., ambulance), a gunshot, a crash, breaking glass or other material, and/or a scream. Based on the received input, the street light assemblies 120 may deviate from the first received lighting profile, for example, by increasing the light intensity (or by decreasing intensity in some cases). This can permit, in some implementations, the street light assemblies 120 to be operating at the least acceptable energy emitting conditions until surrounding activities warrant a situation for higher illumination or power consumption.

This interactive operation may be carried out locally at the light assemblies 120 as well as connectedly via the network 130 at the central controller 140. Either the light assemblies 120 or the central controller 140 may have the authority to override the first issued lighting profile in some implementations. For example, the central controller 140 may communicate a second lighting profile that overrides the first lighting profile in some cases. In some examples, the system 100 may be configured so that only one component may have the highest authority for a final overriding command.

In various implementations, when a light assembly (e.g., assembly 120a) deviates from a received lighting profile based on sensed activity, the assembly may transmit a message to the central controller 140. The message may include, for example, an identifier that identifies the assembly (e.g., assembly 120a), and an indication of the deviation. For example, if the deviation includes an increase in light intensity, the message may indicate the increase, either abstractly or by including an indication of the amount or degree of the increase. In some cases the message may include an indication of the sensed input that preceded the deviation. In some cases the message may include status information regarding the lighting assembly, or status information concerning one or more other lighting assemblies.

In various implementations, network 130 may be a local or wide area network, the Internet, a microwave network, a wireless or wired network, or various combinations of the foregoing. Portions (or all) of network 130 may be proprietary in some cases. The channels 125 may represent a commercial network channel, an operator microwave channel, a radio frequency channel, or other types of secure channels (or not secured in some implementations) that connect each light assembly to the network 130. In some cases, light assemblies may communicate directly with one another over network 130 or otherwise. For example, assembly 120a may send a message to assembly 120b (and any appropriate number of other assemblies) in some implementations, such as a message to increase light intensity at assembly 120b based on detected activity by assembly 120a.

Figure 2A:
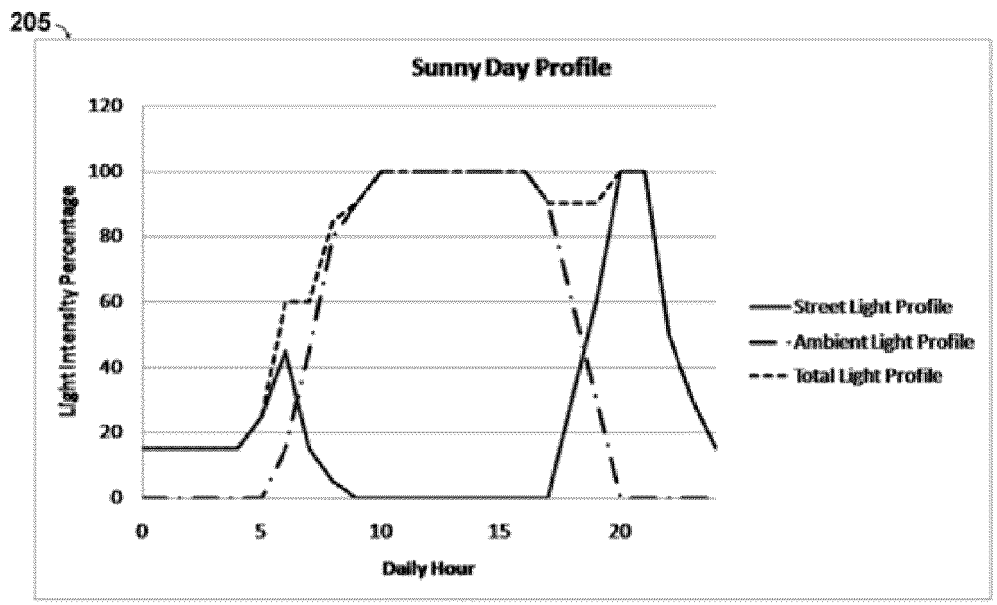
FIGS. 2A, 2B, and 2C show different examples of lighting profiles in accordance with the present disclosure.
Figure 2B:
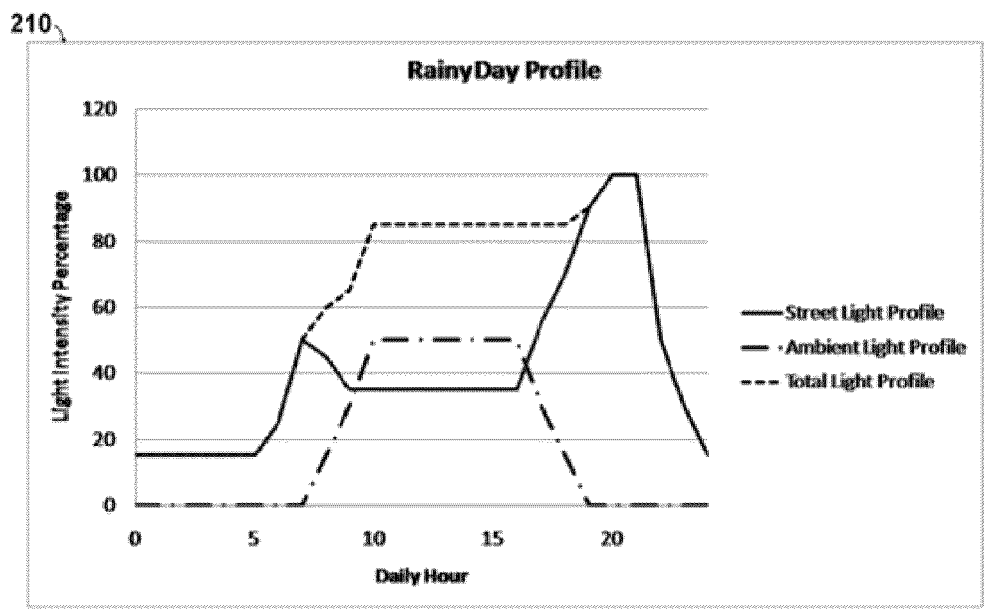

FIGS. 2A and 2B show different example lighting profiles 205 and 210 for controlling the street light management system in accordance with the present disclosure. In FIG. 2A, the example lighting profile 205 represents an example summer sunny day profile predetermined according to a total lighting profile. In the implementation illustrated in FIG. 2A, the horizontal axis represents the daily hour, from midnight to midnight in this example. In other examples, profiles can cover different periods of time (e.g., 6 hours, 8 hours, 10 hours, 12 hours, 48 hours, 72 hours, one week, one month, or the like). The vertical axis represents light intensity percentage. The street light profile that is sent to the street light assemblies 120 may be defined in various ways. In some examples, it may be defined based on a total light profile desired and an ambient light profile. In some examples, the profile may be a simpler profile than illustrated in FIGS. 2A and 2B, and may simply direct the lighting assembly to illuminate at one or more particular intensities over a particular time period, such as a schedule of perhaps different light intensities at different times or durations within the time period (e.g., on at 40% for 1 hour, then on at 80% for the next 4 hours, then on at 25% for the next 4 hours, then off).

Referring again to FIG. 2A, the total light profile may considered to provide sufficient lighting for a particular area, and in some implementations may be considered to comprise a sum of light provided by a streetlight and by ambient lighting conditions. As such, street light illumination may be required only when ambient light (e.g., light provided by sun or moon, or other lighting sources such as building lights, ball-field lights, etc.) is insufficient. As the ambient light profile varies according to seasonal changes as well as geographical factors, the light intensity provided by the street light may be varied. The street light lighting profile can therefore be predetermined to supplement the available ambient light to achieve a total light profile that maximizes energy savings.

As illustrated in FIG. 2A, in a sunny summer day, ambient light may be ample from 6 am to 8 pm. As the sunlight increases in the morning and decreases in the evening, illumination of the street light may be varied accordingly. The street light profile may increase energy output early at 6 in the morning as daily activity begins. The power output then decreases to zero from 6 am to 8 am as the sun rises. As the sun starts setting at 6 pm, the power output for street lights increase to offset the diminished ambient light, and provide sufficient lighting during a time when activity where lighting is desirable is still expected to be prevalent. As the human activity begins to decrease later in the evening (e.g., after 10 pm), the street light may be dimmed (gradually, for example), to a lower intensity for saving energy. The cycle can repeat with seasonal variations recorded for the ambient light profile.

The predetermined street light profile 205, or a portion of it (e.g., the street light profile portion) can be sent from the central controller 140 to the street light assemblies 120 via the network 130 over a communication path 125, as illustrated in FIG. 1. Such a profile can, in some implementations, effectively reduce energy consumption during periods where full intensity lighting is not needed. In addition, such lighting control profile may also be predetermined in weather variation scenarios as shown in FIG. 2B.

FIG. 2B shows an example lighting profile 210 for a summer rainy day. Historical data representing the ambient light profile of a summer rainy day can first be gathered and approximated, and this may occur at the central controller 140, for example. The horizontal axis represents the daily hour, from midnight to midnight. The vertical axis represents light intensity percentage. The street light profile that is sent to the street light assemblies 120 may be defined based on the total light profile required and the ambient light profile. In this example, because of cloudy situation in a rainy day, sunlight has been significantly delayed and reduced, as shown in the ambient light profile. The output for the street light is then boosted to compensate the total light profile.

Figure 2C:
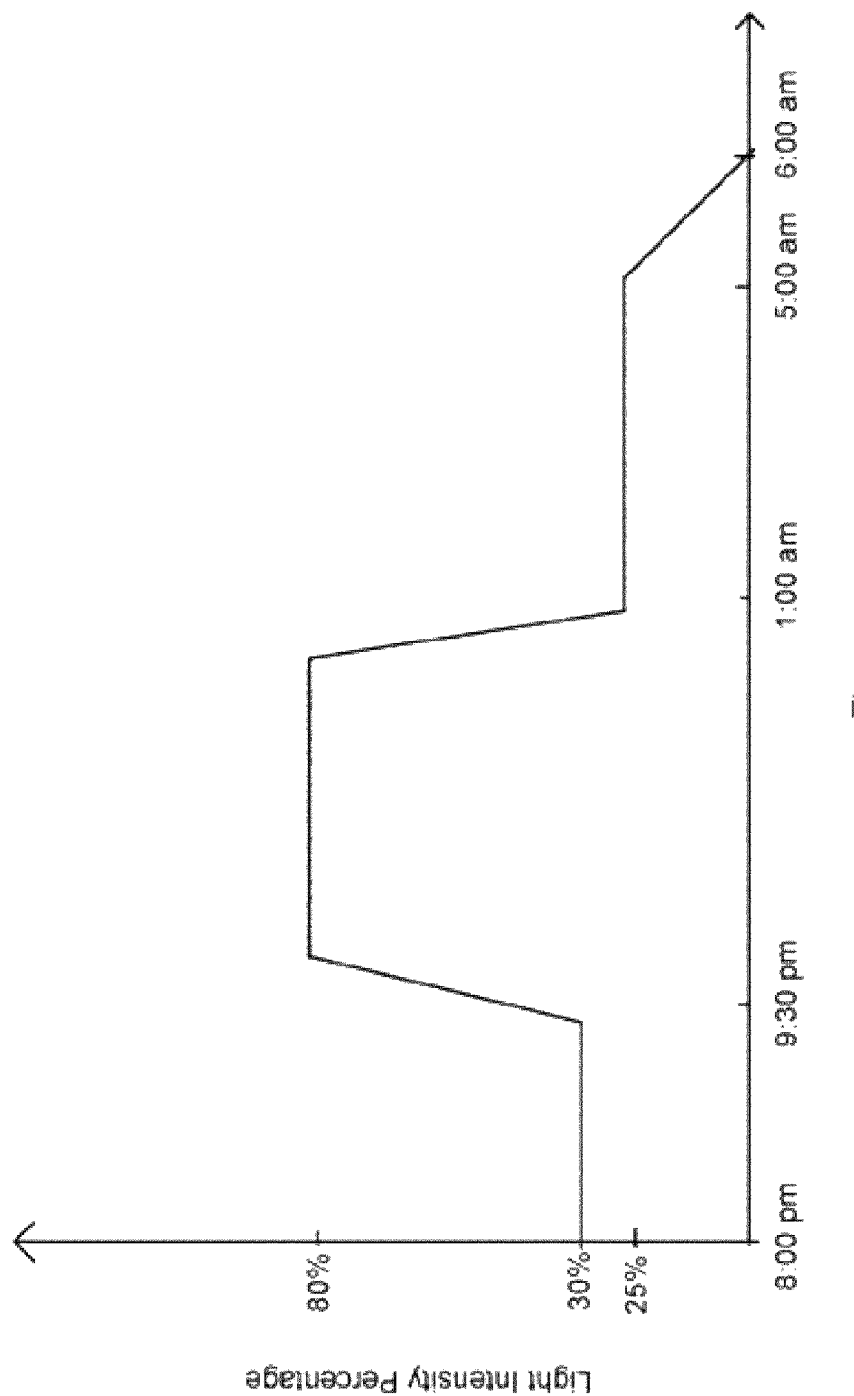

In some implementations, the street light profile may be defined without association with expected or actual ambient light characteristics. For example, FIG. 2C shows a profile defined with respect to light intensities over certain times of a day. As shown, in FIG. 2C, the profile may instruct the lighting assembly to illuminate at 30% intensity from 8:00 PM to 9:30 PM, and then to step or ramp up to 80% intensity at 9:30 PM and remain at 80% intensity until 1:00 AM, and then to step or ramp down to 25% intensity at 1:00 Am and remain at that level until 5:00 AM, and finally to ramp down to 0% (off) during the time from 5:00 AM to 6:00 AM. Other example profiles are possible. As an alternative to times of the day, the profile may indicate a start time (or the start time may be the time received by the assembly), and include durations for each lighting level. A simple profile may call for illumination at 60% from 9:00 PM to 5:00 AM (or for a duration of 8 hours from a given start time, e.g.). These alternatives may simplify the lighting profile definition and may not include historical data in some examples.

The illustrated street light profiles as shown in FIGS. 2A, 2B, and 2C are examples of various profiles that can be provided from the central controller 140 to the lighting assemblies. In various implementations, different lighting assemblies may receive different profiles, based on location, expected activity, anticipated events, population density, or other factors. The profiles can consider various regular and constant factors in some cases, such as ambient light variations and public activities. Although the street lighting profile can be remotely commanded by the central controller, during normal operation, as described in FIG. 1, sensing devices in the street light assemblies may alter the final behavior for adapting activity requirements. This is further discussed in FIGS. 3A to 3F.

Figure 3A:
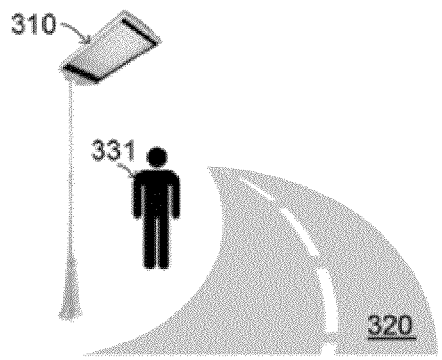
FIGS. 3A to 3F illustrate different example operation schemes for the street light management system.

FIGS. 3A to 3F illustrate different example operation schemes for the street light management system. As shown in FIG. 3A, the street light assembly 310 may be equipped with a motion sensor (not shown) to detect the presence of pedestrians 331 (e.g., pedestrians walking on a sidewalk). The motion sensor can be a passive infrared sensor, an ultrasonic sensor, a microwave sensor, and/or a tomographic detector in various implementations. The motion sensor may detect the presence of an approaching person. In some cases, the assembly may deviate from the lighting profile and increase a light intensity of the light based on the detected input (motion). The street light assembly may react to the sensed signal independent of the central controller, and may temporarily increase the light intensity. For example, the light intensity may be increased from 30% to 80% when someone's presence is detected. The increase may be temporary, such as for a predetermined period of time, and thereafter the assembly may revert to the intensity specified by the lighting profile. For example, the light assembly may increase to 80% intensity for two minutes, 5 minutes, or any appropriate time (perhaps based on the type of detected input), and may return to the original 30% intensity thereafter. The light assembly may also stay at the 80% intensity until no presence signal is further detected in various implementations.

In some implementations, the motion sensor may be a passive infrared sensor that detects body heat. The motion sensor may detect up to 15 to 25 meters, or any other suitable range for one street light. In some implementations, the motion sensor may be an ultrasonic sensor that sends out pulses of ultrasonic waves and measures the reflection off a moving object. The reflection measurement may use Doppler Effect to determine if there is relative motion between the object and the sensor. In some implementations, the motion sensor may be a microwave sensor, which sends out microwave pulses and measures the reflection off a moving object. This reflection measurement may also use Doppler Effect to determine the relative velocity and may be used to measure at a larger range. In some implementations, the motion sensor may be a tomographic detector that senses disturbances to radio waves as the radio waves travel through an area surrounded by mesh network nodes.

The array of street light assemblies 310 in an area may all be interacting with the moving presence. For example, the intensity variation of the light may vary as the location of the presence varies. Multiple street light assemblies 310 may communicate with each other in the network to predict a next variation. In some cases, a particular street light can send a message instructing another light to vary its intensity. If multiple presences are detected, corresponding light assemblies may interact with the presences simultaneously. Multiple presences may also further increase the reacting light intensity. For example, if two or more individuals are detected, the output intensity may be correspondingly set to a higher intensity (e.g., 90% or 100%).

As described above, upon detecting activity and deviating from the lighting profile, the lighting assembly may transmit (e.g., wirelessly) a message to the control center 140 indicating the deviation. In various implementations, a message may be sent each time a deviation from a profile is implemented, or deviations may be compiled at the assembly and a summary message including more than one deviation, optionally with time stamps associated with each, may be sent later (e.g., periodically each hour, once per day, or the like).

Figure 3B:
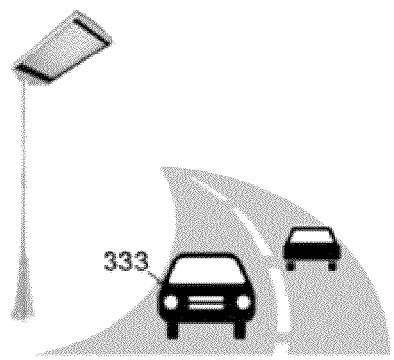

In FIG. 3B, the street light assembly 310 may be equipped with a long range motion sensor and/or a light sensor for detecting approaching vehicles. The long range motion sensor may be an ultrasonic sensor, a microwave sensor, and/or a tomographic detector. The street light assembly may react to the sensing signal by temporarily increasing the light intensity. For example, the light intensity may be increased from 30% to 80% when a vehicle's presence is detected and the light assembly would stay at the 80% intensity for a period of time and return to the original 30% afterwards. The light assembly may also stay at the 80% intensity until no presence signal is further detected.

In some implementations, the street light assembly 310 is equipped with a light sensor for detecting the headlight of an approaching vehicle. The light sensor may be a photo diode, an active pixel sensor, a charge-coupled device, or other types of photo detector. The photo diode is capable of converting light into current or voltage. The photo diode may be operating under photovoltaic mode, photoconductive mode, and/or other modes. The light sensor may be an image sensor such as the charge-coupled device with optics to capture images at the scene. An image processor may be available to process the captured image and interpret the presence of an approaching vehicle.

Figure 3C:
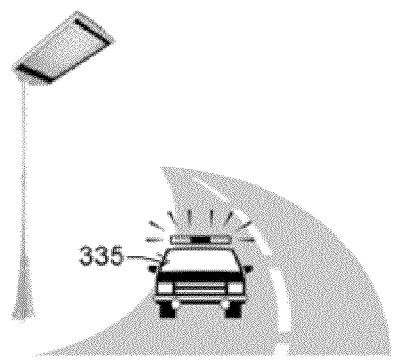

In FIG. 3C, the street light assembly 310 may be equipped with an audio sensor, such as a microphone, to capture certain audio signals. In various implementations, the signals may be compared to stored signals to determine whether a deviation from the lighting profile is warranted. Signatures may be stored for signals such as sirens of police patrol cars, fire trucks, or ambulances, gunshot sounds, crash sounds, cries for help or assistance, explosions, and others. The microphone may be operating under electromagnetic induction (dynamic microphone), capacitance change (condenser microphone), piezoelectric generation, or light modulation to produce an electrical voltage signal from mechanical vibration. This may enable the street light assembly 310 to detect sound patterns and identify the pattern by comparison with references in a data library. If police siren is detected, for example, the street light assembly may respond with a maximum output in the detected area to assist the police operation. In various implementations, the light may direct all lights within a proximity (e.g., one or several blocks) of the light to alter their illumination levels. The assembly may send a message to the central controller 140 as discussed above. In some implementations, the light assembly 310 may relay to a GPS database that detects any police vehicles that pass nearby and react accordingly.

Figure 3D:

In FIG. 3D, the street light assembly 310 may be equipped with radio frequency sensors for detecting the radio frequency activity. For example, radio frequency activity may be used as a proxy for human presence, as people often use mobile phones or other mobile electronic devices while out and about. In some implementations, signal strength may be detected. This may enables the street light assembly 310 to monitor the presence of carriers of electronic devices that emit radio frequencies. The strength of the total radio frequency may indicate the size of the active group so that the street light assembly 310 may react accordingly. For example, if a high strength radio frequency signal is detected, the street light assembly 310 may accordingly increase light intensity. Other street light assemblies in proximity may also be aware of the situation via the network and central controller and act similarly. Bluetooth signals or other electronic communications signals may also be detected.

In some examples, a user may transmit an electronic message for receipt by the light assembly, where the message requests additional light for a period of time. For example, an electronic device may be designed to "chirp" an electronic signal that is recognized by the lighting assembly as a request for additional light, and the light may react by providing additional light. In some cases, the request may be associated with a particular electronic device or user, so that the user may be charged or billed for the request. In some cases, the user may have a collection of paid-for or granted token requests, and when the light reacts by providing additional light, one or more of the token requests may be deducted from the user's balance.

Figure 3E:
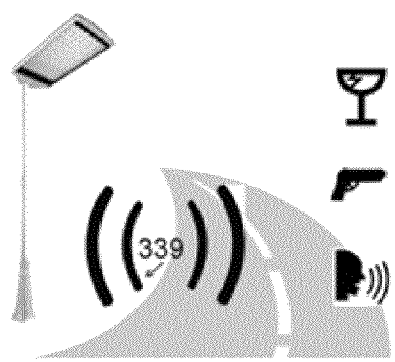

In FIG. 3E, the street light assembly 310 may be equipped with an audio sensor together with a data library including audio data of various scenarios of interest. For example, the data library may include different instances of the sound of glass shattering, gun shots, and human scream. The audio sensor may be a microphone, such as a microphone working under electromagnetic induction (dynamic microphone), capacitance change (condenser microphone), piezoelectric generation, or light modulation to produce an electrical voltage signal from mechanical vibration. The library of sounds may be stored in memory of the lighting assembly, for example.

Figure 3F:
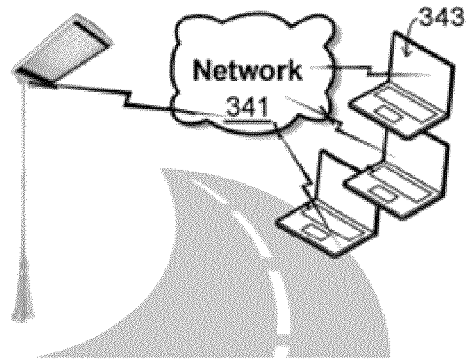

In FIG. 3F, the street light assembly 310 may be receiving instructions from a network that allows remote online users to vote for a change in the lighting profile. This may be useful when a change of schedule of public activity occurs, or other situation when other equipped sensors cannot appropriately adjust the light intensity according to the public needs.

The street light assembly 310 may be equipped with a combination of one, some, or all of the sensors described in FIGS. 3A to 3F, depending on installation preference or on an importance of the street light assembly 310 location. The sensors enable the street light assembly 310 to detect activity of its surroundings and accordingly deviate from the lighting profile.

Figure 4:
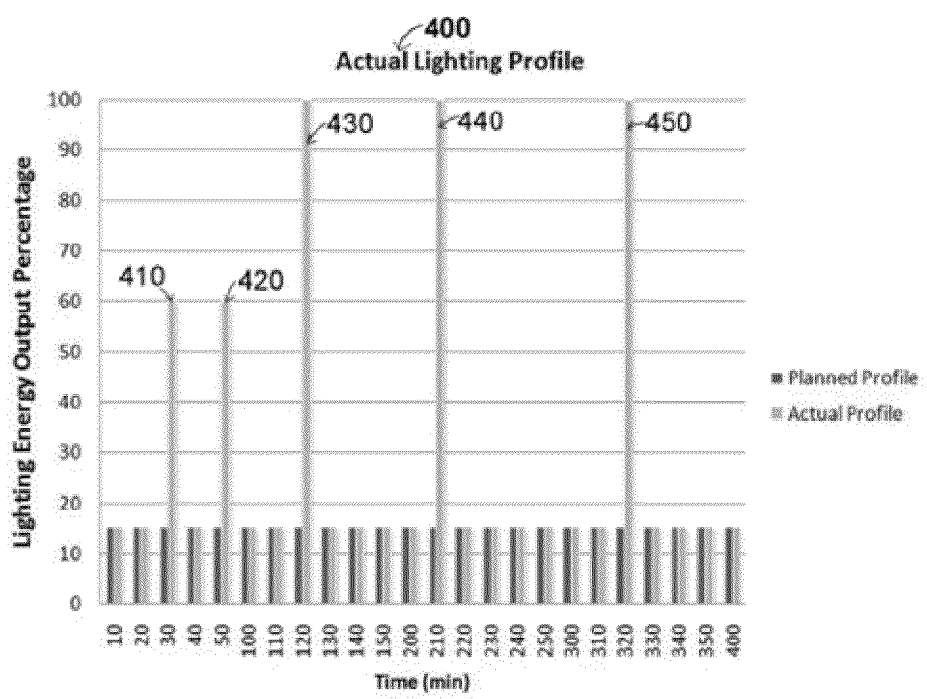
FIG. 4 shows an example lighting profile in various impromptu situations in accordance with the present disclosure.

FIG. 4 shows an example lighting profile 400 in various impromptu situations in accordance with the present disclosure. The example lighting profile 400 illustrates an actual lighting profile in which light intensity deviates from planned profiles. The selected time period is from midnight to 4 am, as indicated in the horizontal axis in minutes. The vertical axis indicates the lighting energy output percentage from 0 to 100%. The planned lighting profile has been set at 15% light intensity if no proximity activity is detected. As shown in FIG. 4, five incidents 410, 420, 430, 440 and 450 have occurred at respectively 0030, 0050, 0120, 0210 and 0320 hours.

At the 0030 hour, movement of a pedestrian is detected by a motion sensor in the street light assembly, indicated by the incident 410. The street light assembly accordingly increases the light intensity from 15% to 60% (as an example, other values are possible) for a period of minutes. At 0050 hour, movement of a motor vehicle has been detected by a photo detector in the street light assembly, indicated by the incident 420. The street light assembly accordingly increases the light intensity from 15% to 60%. In both these scenarios, the street light assembly may increase the light intensity for a period of time, measured by an internal timer, and revert the light intensity back to 15% once the end of the time period is reached, and otherwise continue to follow the profile thereafter.

At 0120 hour, siren of a police patrol car is detected by an audio sensor in the street light assembly, indicated by the incident 430. The street light assembly increases the light intensity from 15% to 100% in this example. At 0210 hour, a sound of gunshot is detected by a microphone in the street light assembly, indicated by the incident 440. The street light assembly compares the detected sound with reference data in a stored library of sounds to identify the type of sound, and determines it is a gunshot; then the street light assembly accordingly increases the light intensity from 15% to 100%. In both these scenarios, the street light assembly may increase the light intensity for a predetermined or indefinite period of time, for example until a release signal is sent from the central controller via network 130 to the lighting assembly. The central controller may receive the release signal from the police department, in some examples. In other examples, the police, fire, or utility companies may directly communicate with an individual lighting assembly without going through the central controller.

At 0320 hour, the radio frequency intensity is measured to be over a threshold value and this triggers the light assembly to change the lighting profile as indicated by the incident 450. The street light assembly accordingly increases the light intensity from 15% to 100%.

In some examples, the lighting assembly may delay deviating from the profile until a sufficient number of input activity events have been detected. The assembly may include a counter that increments when an activity is detected and compares the value to a threshold, and deviates from the profile if the value meets or exceeds the threshold. The count value may vary depending on the type of input (e.g., a higher count value for a police siren than for a regular passing vehicle). The assembly may monitor over a fixed or sliding window of time, for example. The counter may decrement after periods of inactivity (i.e., lack of detected activity) in some cases.

Figure 5:
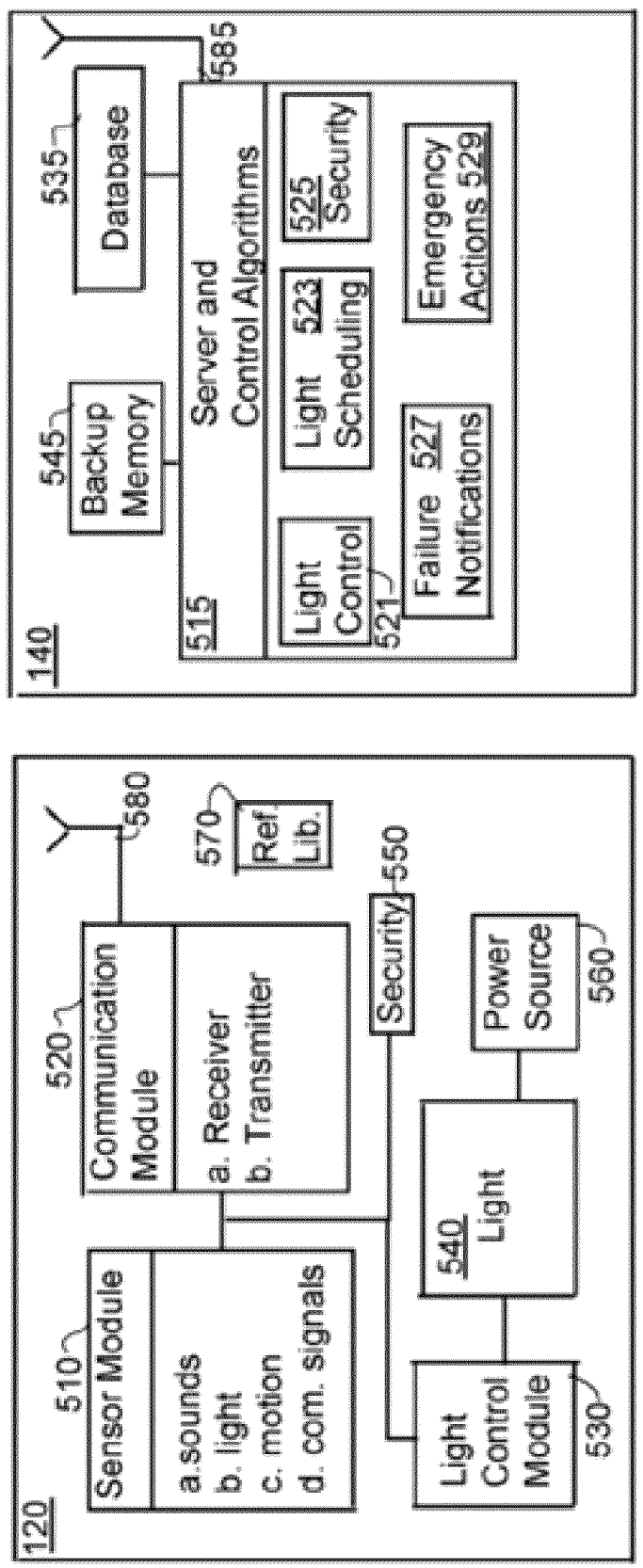
FIG. 5 illustrates an example system diagram of a light assembly and a central controller in accordance with the present disclosure.

FIG. 5 illustrates an example system diagram of a light assembly 120 and a central controller 140 in the street light management system in accordance with the present disclosure. The light assembly 120 may be the same as the light assembly 120 in FIG. 1; and the central controller 140 may be the same as the central controller 140 in FIG. 1. In this implementation, the light assembly 120 may include a sensor module 510, a communication module 520, a light control module 530, a light 540, a power source 560, a security module 550, and a reference library 570.

The sensor module 510 may include an audio sensor for detecting sounds in various frequency ranges, a light sensor for detecting the change of ambient light, a motion sensor for sensing proximity activities, a communication signal sensor for detecting or receiving communication signals, and a power consumption sensor for measuring power consumption in the light assembly 120. The power consumption sensor may measure the rate of power use as well as the total amount of power consumption at the light assembly. Other sensor types have been discussed in FIGS. 3A to 3F. Other sensors that could be included in sensor module 510 could be particular sensors that sense for smoke, natural gas, chemicals dispersed in the air, and the like.

An energy consumption calculator (not shown), may be included to monitor the energy use in the street light assembly by measuring Amp-hour and/or Watt-hour readings. The lighting assembly 120 may transmit this measurement data to the central controller 140 via the communication module 520 (e.g., over antenna 580). This information may be analyzed in the central controller 140 and used to improve the energy saving lighting profile.

The communication module 520 may include a receiver and a transmitter. The receiver converts signals from a radio antenna 580 to a usable form. The receiver may receive electromagnetic waves at a certain frequency and demodulate the signals into useable form. The transmitter can send messages, including the sensing data as well as other data forms to the central controller 140 over antenna 580 (or another antenna). The communication module 520 may also include other devices that allow for a secure connection. The communication module 520 is connected with the antenna 580. In various implementations, assembly 120 may communicate with central controller 140 or with other lighting assemblies 120. In some cases, assembly 120 may communicate with other electronic devices (e.g., phones, laptops, tablets, police/fire/ambulance communication systems, and the like).

The light control module 530 may use various methods in controlling the intensity of the light 540. For example, the light control module 530 may use pulse width modulation (PWM) to adjust the power output of an LED type light 540. In some implementations, the average value of voltage (and current) fed to the load is controlled by turning the switch between supply and load on and off at a defined pace. The longer the switch is on compared to the off periods, the higher the power supplied to the load may be, for example. An advantage of PWM, in some implementations, is that power loss in the switching devices may be very low. When a switch is off there may be practically no current, and when it is on, there is almost no voltage drop across the switch. Power loss, being the product of voltage and current, may thus in both cases be close to zero. PWM also works well with digital controls, which, because of their on/off nature, can easily set a desired duty cycle.

In some implementations, the light control module 530 includes means for controlling current or voltage applied to the light 540, such as potentiometers, voltage regulators, and other type of current and/or voltage control. When the light 540 includes an array of luminaries, such as in an LED light, the light control module 530 may selectively control a portion of the LED arrays to achieve various power output control. For example, the light may control a portion of sub-lights that comprise light 540 to turn on or off. For example, the light control module 530 may enable the same percentage of light arrays on/off according to the total power output percentage. In other cases, the control module 530 may cause lights to illuminate at different intensity levels.

The light control module 530 is connected with the communication module 520, the sensor module 510 and a security module 550. The security module 550 may determine the validity of communication between the communication module 520 and the light control module 530, by verification techniques such as using pass keys, security answers, and other security techniques. In some embodiments, the security module enables the street light assembly 120 or the central controller 140 to reject unauthorized control signals/commands.

The light 540 may be powered by various power sources. A common power source may be the power supply provided in the city. Optionally, other renewable power source such as solar and wind energy may be utilized and stored in local batteries, as well.

The light assembly 120 may include a reference library 570 that includes a variety of sound such as glass shattering, siren, gunshot, screaming, etc. The reference library 570 may be used to compare with the sensed audio signal to identify the sensed signal. The assembly may adjust its light output based on the type of sensed signal, for example.

The central controller 140 may include server and control algorithms 515, a database 535 and a backup memory 545 (e.g., tape drive). The server and control algorithms 515 may include several control sub-modules such as a light control module 521, a light scheduling module 523, a security module 525, a failure notification module 527 and an emergency actions module 529. The database 535 may include historical data used to determine the lighting profile, previous sensing measurements, and incidental events data. The database 535 may include all information stored in the local reference library 570 in the street light assembly 120, in some implementations.

The light control module 521 may function similarly to the light control module 530, except that it may have higher or lower authority to override the local commands. The light control module 521 may use various methods in controlling the intensity of the light 540. The light control module may formulate lighting commands to a particular lighting assembly, for example.

The light scheduling module 523 may be responsible for determining the lighting profile for a lighting assembly or for a group of lighting assemblies. Such profiles can vary on a seasonal, monthly, weekly, daily, or hourly basis, for example, or can vary with respect to events or activities. Profiles can vary with seasonal variations. The light scheduling module 523 may be used to determine the onset and ending of each illumination cycle, the rate of change in the profile and other lighting profile characteristics. As described above, profiles can also specify varying levels of information, and the light scheduling module 523 can determine an appropriate level of detail for a particular assembly (e.g., based on capability of a particular assembly).

The security module 525 may function similarly as the security module 550. The security module 550 may provide a security feature for messages sent from the controller 140, so that the receiving light assembly may verify that the communication is from a trusted source. In some embodiments, the security module enables the street light assembly 120 or the central controller 140 to reject unauthorized control signals/commands.

The failure notification module 527 is included to indicate a failure in changing the lighting profile with sensed signals and/or a failure in communicating with the street light assembly about the lighting profile. The emergency actions module 529 may allow a user to manually override the commands for the street light assembly 120. The override operation includes manual input of the lighting profile, as well as shutting down, reboot, and/or other operations.

Figure 6:
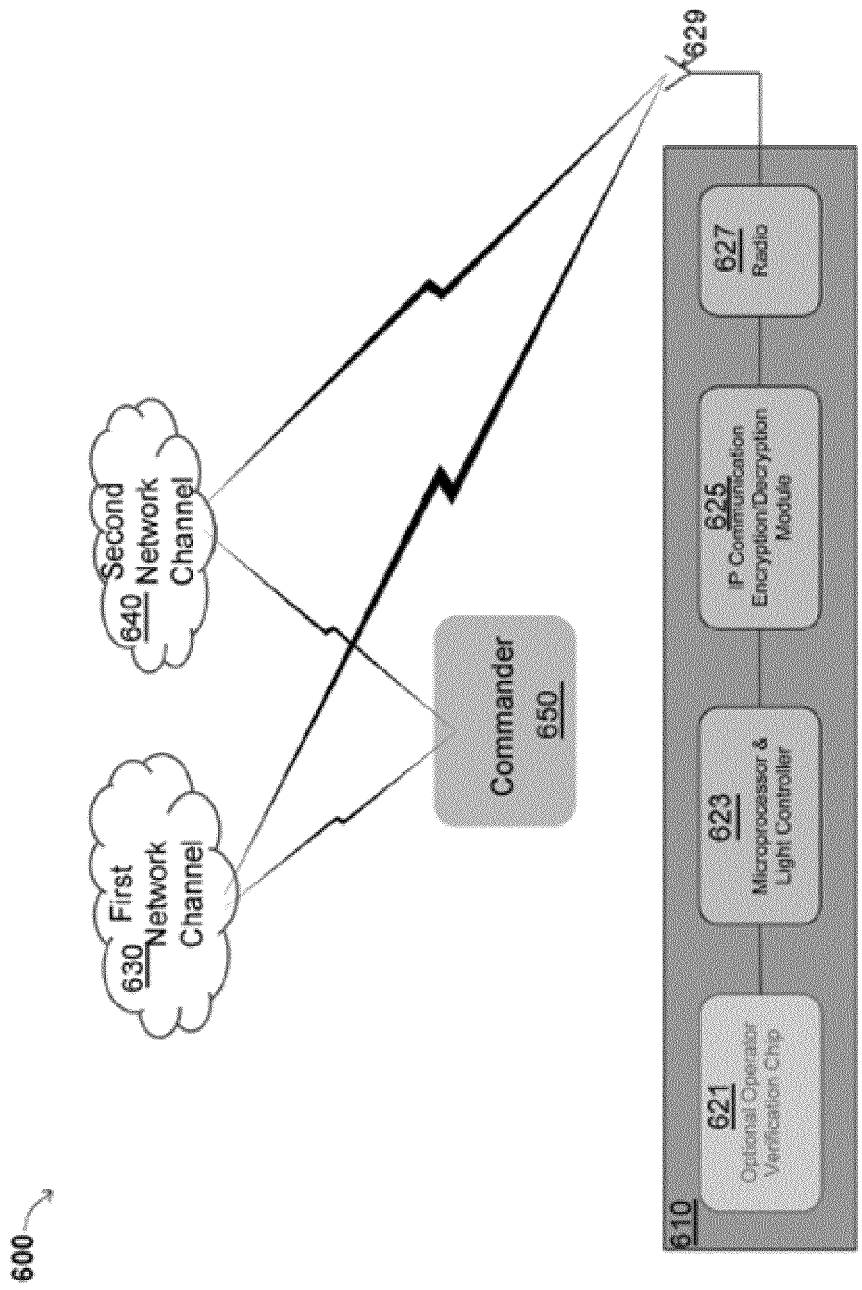
FIG. 6 illustrates an example network system for connecting the light assembly to the central controller in the street light management system in accordance with the present disclosure.

FIG. 6 illustrates an example network system for connecting the light assembly to the central controller in the street light management system in accordance with the present disclosure. As described above, in some cases communications that include a security feature may be used to help combat against nefarious intent by unauthorized parties. FIG. 6 illustrates an example of equipment that can be used to implement a heightened security communications protocol. A commander 650, which may be the central controller 140 in some implementations or in a streetlight assembly in some implementations, may create a communications payload that includes a lighting profile or command to be applied at a lighting assembly, and includes a challenge question and required response. The payload is encrypted and signed and sent to the lighting assembly 610 wirelessly via a network (e.g., a microwave network, the Internet, a cellular network, an RF network, or a combination of the foregoing). The lighting assembly 610 receives the message over an antenna 629 of the lighting assembly. A radio module 627 of the lighting assembly delivers the encrypted message to an IP Communication module 625, where the signal is authenticated and the payload is decrypted. The decrypted payload is then delivered to a processor 623, which parses the payload and optionally delivers the challenge question to a verification module 621, if provided. The verification module 621 may interpret the challenge question and reply with an answer to the question. The processor 623 verifies that the response from the module 621 matches the response included in the message, and executes the lighting profile (or begins executing it) if the answer is correct. If the answer is incorrect, the command may not be executed. This may add an extra layer of security of standard encryption/decryption methods, and may add a utility-specific check on security. That is, the entity (e.g., an energy company or city office) in charge of the lighting system may be the only party with access to module 621. In some cases, challenge-response security pairs may be one time use only, and may be time-limited. The module 621 may need to provide a correct response within a predetermined period of time; otherwise a timeout may prevent further action.

In some implementations, all communications between components of the lighting system may be subject to a security protocol similar to that described above with reference to FIG. 6. For example, lighting assembly 120 (e.g., assembly 120a, 120b, . . . 120i) and/or central controller 140 may include one or more aspects of FIG. 6 (e.g., radio 627, module 625, processor 623, chip 621) and may decode messages received in the manner described above. Similarly, any of the light assemblies or control centers may be configured to assemble messages that include a message payload with a challenge question and response. In some cases, encryption and decryption provided by module 625 may be sufficient to alleviate security concerns, but in some cases the extra security afforded by the challenge question (or security question) and answer functionality may be desired. Components that send commands may be configured to provide payloads and challenge questions/responses. Components that receive commands or updates may be configured to receive and process the payloads and challenge questions. In various implementations, the communications algorithms used by the various components may include detection of attempts by unauthorized parties to jam the system, as by a type of cyberattack, or nuisance disturbances designed to trick the system into providing continuous and uninterrupted lighting at high intensities. In some examples, a single IP address can be used for communication between components of the system. In some examples, two IP addresses can be used for communication between components of the system. In some implementations, secure communications may not be needed, and communications may occur without security questions/answers.

In some embodiments, two or more lighting assemblies may collaborate by contributing signals according to a predetermined weighting distribution. For example, signals measured at different locations may have different significance/priority with respect to activity determination. The control system 140 (or one of the lighting assemblies) may use the weighting distribution in determining an appropriate lighting profile or in determining an appropriate deviation from the currently assigned lighting profile, according to some implementations. In some embodiments, some or all of the lighting assemblies may be communicably coupled to the central control system 140, and/or may communicate with each other via a mesh network. The mesh network may offer fault-tolerant communications among or between components of the system in certain situations.

The communication scheme may rely primarily on a network such as the internet, and may also rely on a secondary network such as a cellular network, or a utility channel (e.g. microwave, radio frequency) to establish direct communication between devices. All communications, end-point authentication, and data-handling may meet any regulatory security requirements, if applicable. In some examples, devices may directly connect to the internet or other network, or may indirectly connect to the internet or other network via a cellular network, or a utility channel, or both.

The control algorithms of the central controller 140 may monitor activity (type, frequency, level) reported by the lighting assemblies, and may use the information to adjust future lighting profiles so that energy can be conserved, lighting pollution can be reduced, or cost savings realized. In some cases, measured activity can be compared against baseline values. In some examples, differential values may be computed using measurements from two or more lighting assemblies.

In some cases, baseline values can be associated with certain weather conditions or seasonal conditions. For example, a baseline value may represent a signal expected when particular weather is occurring (rain, hail, snow, wind, calm, or others). In some cases, the system may be aware of the current weather conditions for an area and the algorithm may use an appropriate baseline value or values when determining a lighting profile. As one example, warm ambient temperatures may mean that more pedestrians are expected than when it is bitterly cold.

Lighting assemblies may use the described sensors to sense for activity at various intervals. For example, in some cases measurements may be done about once every second, every two seconds, every 3 seconds, every 5 seconds, every 10 seconds, every 15 seconds, or according to any other appropriate measurement interval. In some examples, different sensors may monitor at different monitoring intervals.

Figure 7:
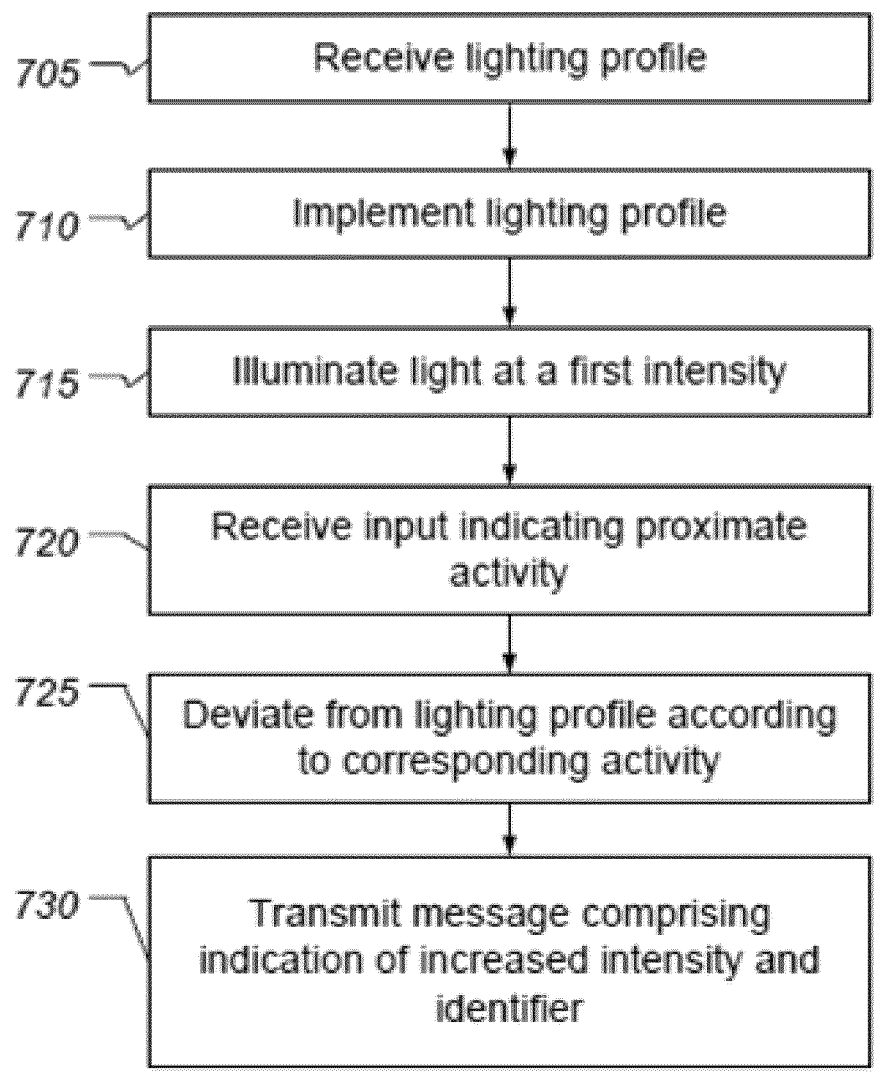
FIG. 7 shows an example method that may be performed by a lighting assembly in accordance with the present disclosure.

FIG. 7 shows an example method 700 for managing an energy saving light system in accordance with the present disclosure. The method may also be used to reduce light pollution, for example. The energy managing method 700 initiates at step 705, where the street light assembly receives a lighting profile. The lighting profile may be prepared by a central controller, for example, and may be received wireless by the lighting assembly following transmission by the central controller. The lighting assembly next implements the lighting profile at step 710, as by illuminating a light at a first intensity specified by the lighting profile 715. The light assembly may include one or more sensors configured to sense activity. At step 720, the light assembly receives an input indicating proximate activity. In various examples, the proximate activity may be a passenger walking by, a car driving by, police patrol cars driving by, people gathering, a detected communication signal, a gunshot, the sound of glass shattering, a scream, smoke, natural gas, or chemical particles, and/or network input from collective voting.

The light assembly may next deviate from the lighting profile 725. In particular, the lighting assembly may increase (or decrease) the lighting intensity based on the activity detected. At step 730, the street light assembly may transmit a message that includes indications of increased intensity and an identifier associated with the light assembly.

Figure 8:
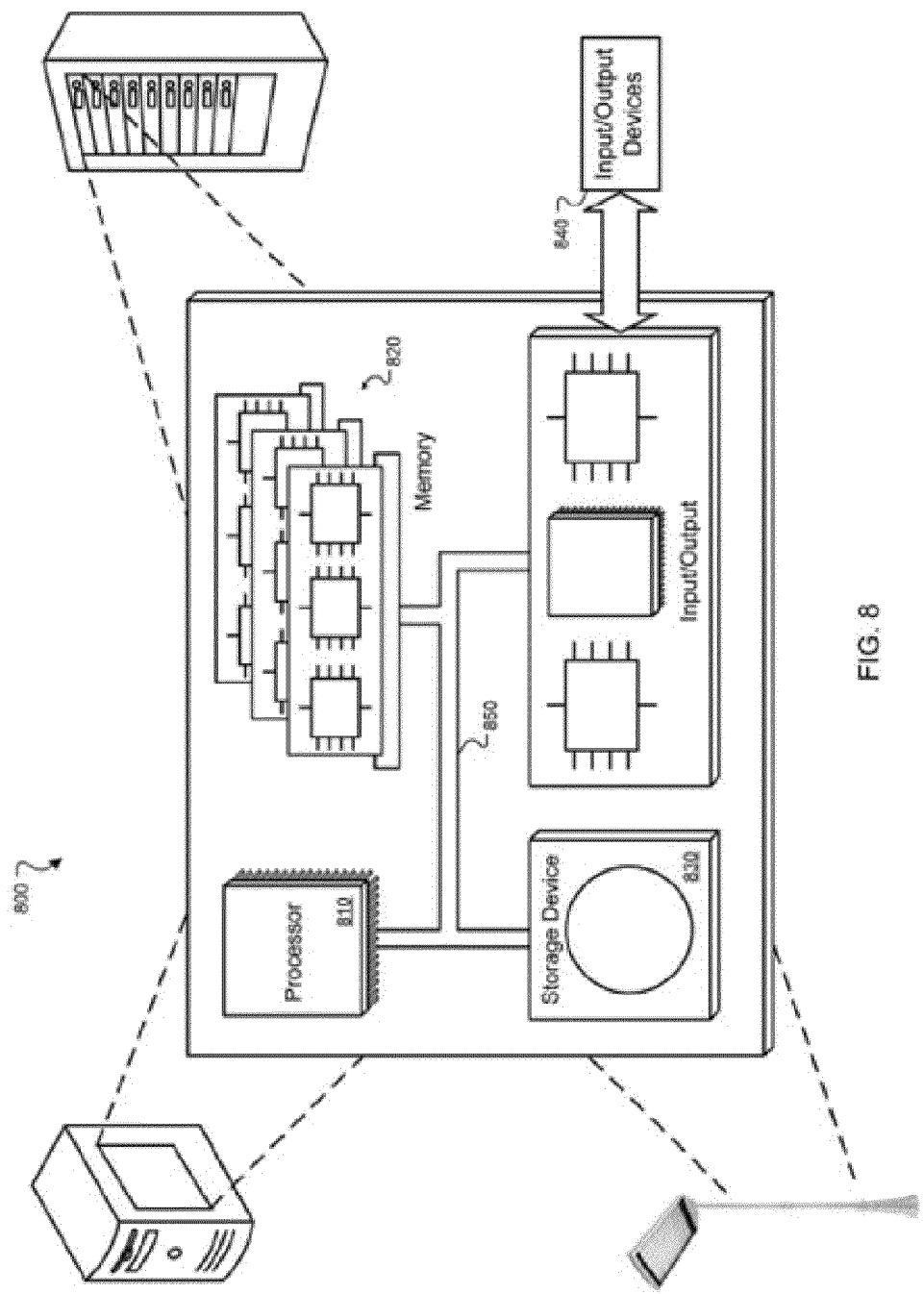
FIG. 8 is a schematic diagram of a generic electronic system 800

FIG. 8 is a schematic diagram of a generic electronic system 800. The system 800 can be used for the operations described in association with any of the computer-implement methods described previously, according to some implementation. The system 800 includes a processor 810, a memory 820, a storage device 830, and an input/output device 840. Each of the components 810, 820, 830, and 840 are interconnected using a system bus 850. The processor 810 is capable of processing instructions for execution within the system 800. In one implementation, the processor 810 is a single-threaded processor. In another implementation, the processor 810 is a multi-threaded processor. In one implementation, the processor 810 is a microcontroller. The processor 810 is capable of processing instructions stored in the memory 820 or on the storage device 830 to perform actions associated with the methods discussed herein.

The memory 820 stores information within the system 800. In one implementation, the memory 820 is a computer-readable medium. In one implementation, the memory 820 is a volatile memory unit. In another implementation, the memory 820 is a non-volatile memory unit.

The storage device 830 is capable of providing mass storage for the system 800. In one implementation, the storage device 830 is a computer-readable medium. In various different implementations, the storage device 830 may be a floppy disk device, a hard disk device, an optical disk device, or a tape device.

The input/output devices 840 provides input/output operations for the system 800. In some implementation, the input devices include one or more of the sensors discussed previously. In some implementations, the output devices comprise one or more lights of the lighting assembly.

In various implementations, the lighting assemblies may include one or more portions of the system 800. In various implementations, the central controller may include one or more portions of the system 800. In the case of the central controller, I/O devices can include keyboard, mouse, display monitor, printer, and the like. The monitor may be used to display graphical user interfaces, for example.

The features described can be implemented in digital electronic circuitry, or in computer hardware, firmware, software, or in combinations of them. The apparatus can be implemented in a computer program product tangibly embodied in an information carrier, e.g., in a machine-readable storage device or in a propagated signal, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

A number of implementations have been described. Nevertheless, it will be understood that various modifications may be made. Accordingly, other implementations are within the scope of the following claims.

What is claimed is:

1. A computer-implemented method of managing energy use in a system of lights, comprising:

receiving, at a communications receiver of a first lighting assembly, a lighting profile that instructs the first lighting assembly to operate according to the lighting profile over a first period of time, the lighting profile received wirelessly by the communications receiver from a control center remote from the first lighting assembly, wherein the control center additionally provides lighting profiles to a plurality of other lighting assemblies;

implementing, at the first lighting assembly, the received lighting profile, including causing a light of the first lighting assembly to illuminate at a first intensity;

receiving, at a sensing module of the first lighting assembly, an input acquired in proximity to the first lighting assembly, the input indicating an activity level in a region proximate the first lighting assembly;

deviating from the received lighting profile by varying the intensity of the light of the first lighting assembly, in response to the received input acquired in proximity to the first lighting assembly, by causing the light of the first lighting assembly to illuminate at a second intensity for a predetermined period of time, the second intensity different than the first intensity; and wirelessly transmitting a message via a communications transmitter of the first lighting assembly for receipt by the control center, the message comprising an indication of the second intensity and an identifier associated with the first lighting assembly.

2. The computer-implemented method of claim 1, wherein the second intensity is greater than the first intensity.

3. The computer-implemented method of claim 1, wherein the second intensity is less than the first intensity.

4. The computer-implemented method of claim 1, wherein the input comprises a radio frequency signal indicative of an electronic device used within the region proximate the first lighting assembly.

5. The computer-implemented method of claim 4, wherein the input comprises request for additional light and is associated with a particular electronic device or user, and further comprising increasing the intensity of the light and billing the particular electronic device or user for the request.

6. The computer-implemented method of claim 4, wherein the radio frequency signal is received from an emergency response communication system.

7. The computer-implemented method of claim 1, wherein the input comprises a sound.

8. The computer-implemented method of claim 7, wherein in the sound is a gunshot sound.

9. The computer-implemented method of claim 7, wherein the sound is associated with a motorized vehicle.

10. The computer-implemented method of claim 1, wherein the input comprises a light signal based on ambient lighting conditions.

11. The computer-implemented method of claim 1, wherein the input comprises detected motion within the region proximate the first lighting assembly.

12. The computer-implemented method of claim 1, wherein the lighting profile is based on expected weather conditions.

13. The computer-implemented method of claim 1, wherein communications between the first lighting assembly, the control center, and the plurality of other lighting assemblies occur over a mesh network.

14. The computer-implemented method of claim 1, wherein the sensing module comprises a long-range motion sensor.

15. The computer-implemented method of claim 1, further comprising receiving, at the communications receiver of the first lighting assembly, a communication from a second lighting assembly, and varying light intensity of the light of the first lighting assembly based on the received communication from the second lighting assembly.

16. The computer-implemented method of claim 1, wherein the message includes an indication of energy usage by the first lighting assembly.

17. The computer-implemented method of claim 16, wherein the control center, based on the indication of energy usage and on other indications of energy usage received from other lighting assemblies of the plurality of other lighting assemblies, determines a second lighting profile and instructs one or more lighting assemblies to implement the second lighting profile.

18. The computer-implemented method of claim 1, wherein the message includes a request that the control center instruct lighting assemblies in a vicinity of the first lighting assembly to adjust their light intensities.

19. The computer-implemented method of claim 1, further comprising wirelessly transmitting a second message via the communications transmitter of the first lighting assembly for receipt by other lighting assemblies of the plurality of other lighting assemblies, the second message comprising an instruction to the other lighting assemblies to adjust their light intensities.

20. The computer-implemented method of claim 1, further comprising receiving, with the lighting profile, a security question, the lighting profile and the security question included in a message from the control center, and wherein accessing the lighting profile is dependent on the first lighting assembly providing a correct answer to the security question.

21. The computer-implemented method of claim 1, wherein the message includes an indication of the input acquired in proximity to the first lighting assembly, and wherein the control center, based on the indication of the input and on other indications of inputs received from other lighting assemblies of the plurality of other lighting assemblies, determines a second lighting profile and instructs one or more lighting assemblies to implement the second lighting profile.

22. A lighting assembly, comprising:
a light;
a communications receiver configured to receive a lighting profile that instructs the lighting assembly to operate according to the lighting profile over a first period of time, the lighting profile received wirelessly by the communications receiver from a control center remote from the lighting assembly, wherein the control center additionally provides lighting profiles to a plurality of other lighting assemblies;
a light control module configured to implement the received lighting profile, including causing the light to illuminate at a first intensity;
a sensor module configured to receive an input acquired in proximity to the lighting assembly, the input indicating an activity level in a region proximate the lighting assembly;
wherein the light control module is additionally configured to deviate from the received lighting profile by varying the intensity of the light, in response to the received input acquired in proximity to the lighting assembly, by causing the light to illuminate at a second intensity for a predetermined period of time, the second intensity different than the first intensity; and
a communications transmitter configured to wirelessly transmit a message, for receipt by the control center, the message comprising an indication of the second light intensity and an identifier associated with the lighting assembly.

\* \* \* \* \*